H. S. BREWINGTON.
CANDY PULLING MACHINE.
APPLICATION FILED MAY 7, 1908.

941,610.

Patented Nov. 30, 1909.
3 SHEETS—SHEET 2.

WITNESSES

INVENTOR
Henry S. Brewington
By E. Walton Brewington
his Attorney

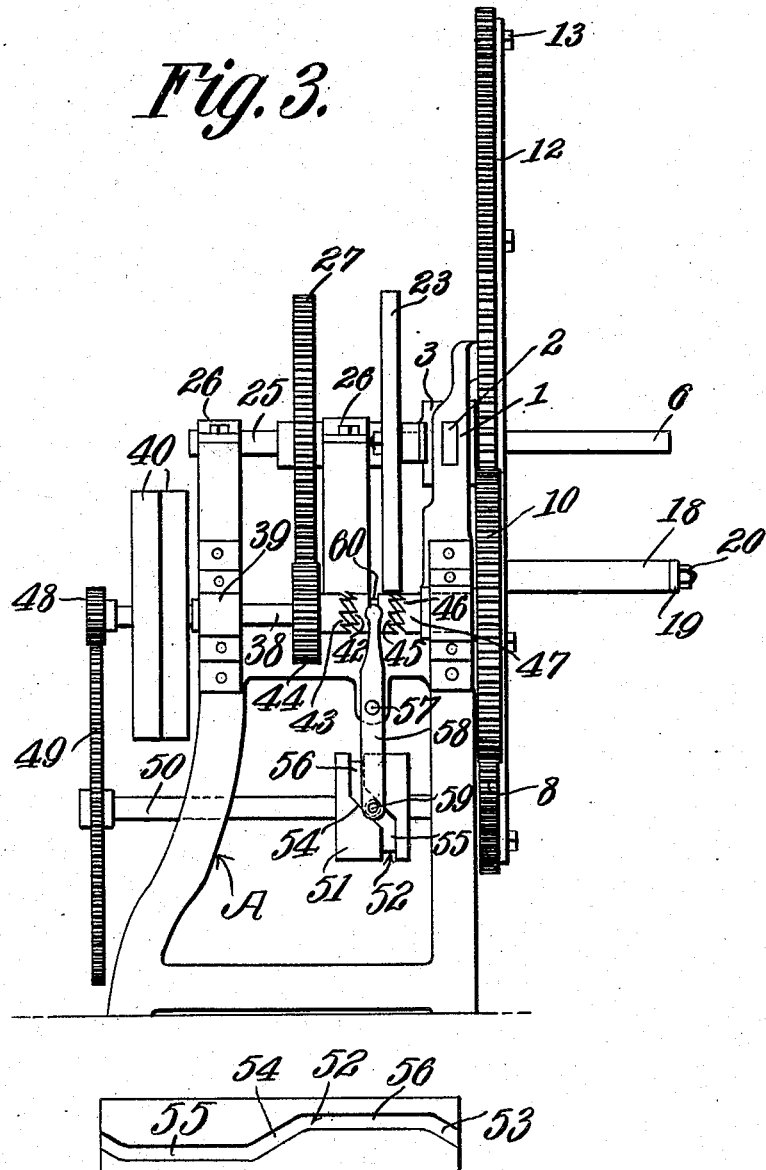

UNITED STATES PATENT OFFICE.

HENRY S. BREWINGTON, OF BALTIMORE, MARYLAND, ASSIGNOR OF ONE-HALF TO RICHARD B. TIPPETT, OF BALTIMORE, MARYLAND.

CANDY-PULLING MACHINE.

941,610.  Specification of Letters Patent.  Patented Nov. 30, 1909.

Application filed May 7, 1908. Serial No. 431,302.

*To all whom it may concern:*

Be it known that I, HENRY S. BREWINGTON, a citizen of the United States, residing at Baltimore city, State of Maryland, have invented certain new and useful Improvements in Candy-Pulling Machines, of which the following is a specification.

My invention relates to candy pulling machines, and has for its object improvement in that class of machines and provides among other things mechanism adapted for the pulling of candy so as to work it into proper condition during the manufacture. For the purpose of preparing candy, after the syrup has been boiled to the proper consistency, it is allowed to cool, so as to form a waxy and plastic mass of any desired size or weight. This mass, which is at first of a dark color, must be pulled continuously, so as to allow air to be mixed with it, and this gradually bleaches it and lightens it and makes it fit for the class of candy which is to be made from the batch. The mechanism provided by my invention for the purpose of pulling the candy is such that after the batch has been once elongated or pulled, the same is returned to a position where it is engaged by an arm and lapped over or wrapped around the arms which caused the aforesaid elongation, so that it is again acted upon by again being elongated by the said arms, these alternate operations continuing until the desired tint or porosity of the batch is obtained. To produce these results, I employ certain novel features of construction, combinations and arrangement of parts which will be hereinafter described and pointed out in the claims; the following description, taken in connection with the accompanying drawings, and appended claims being deemed sufficient to enable others skilled in the art to which it belongs to understand and construct the same.

Figure 1:
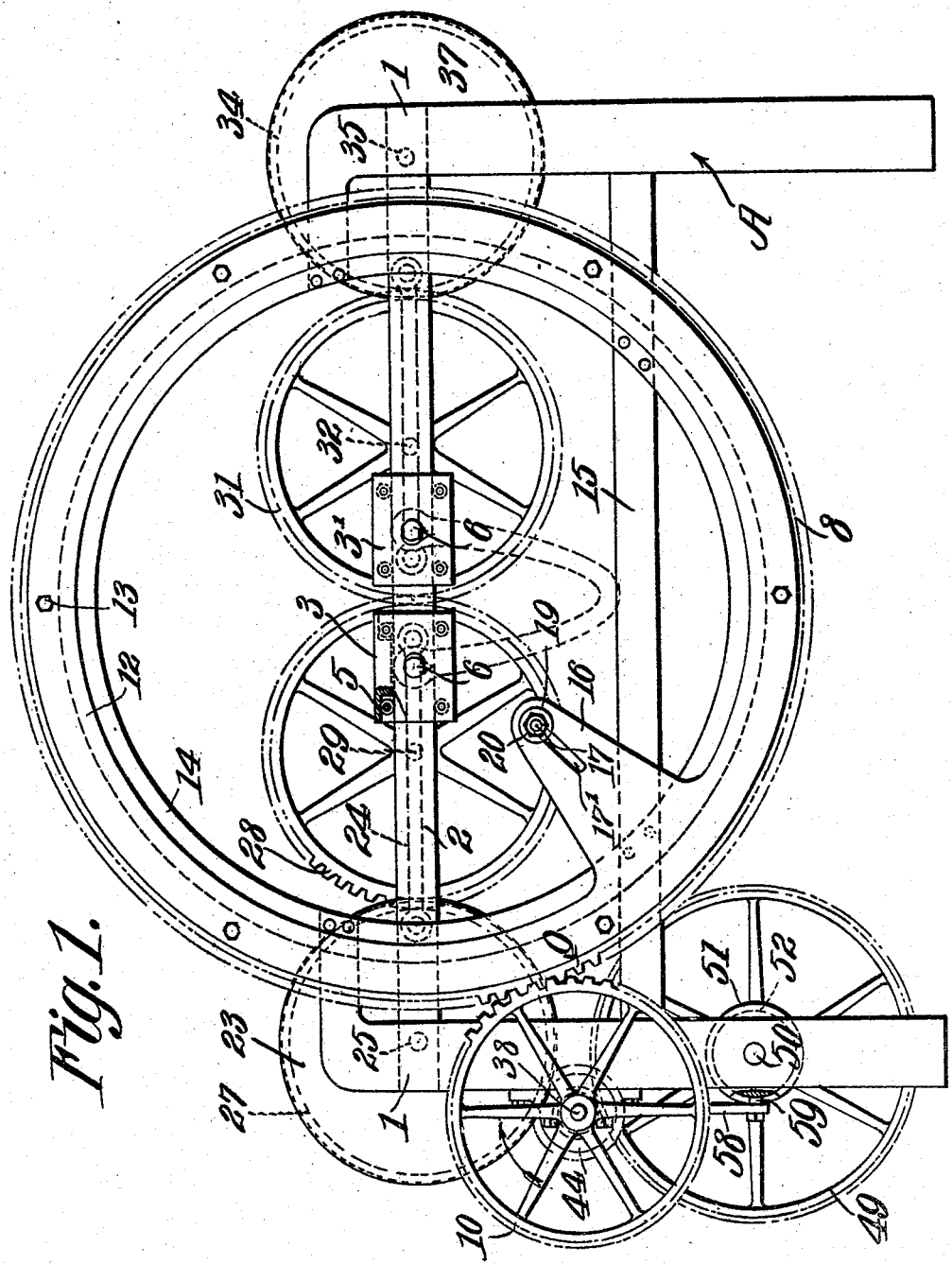
Figure 2:
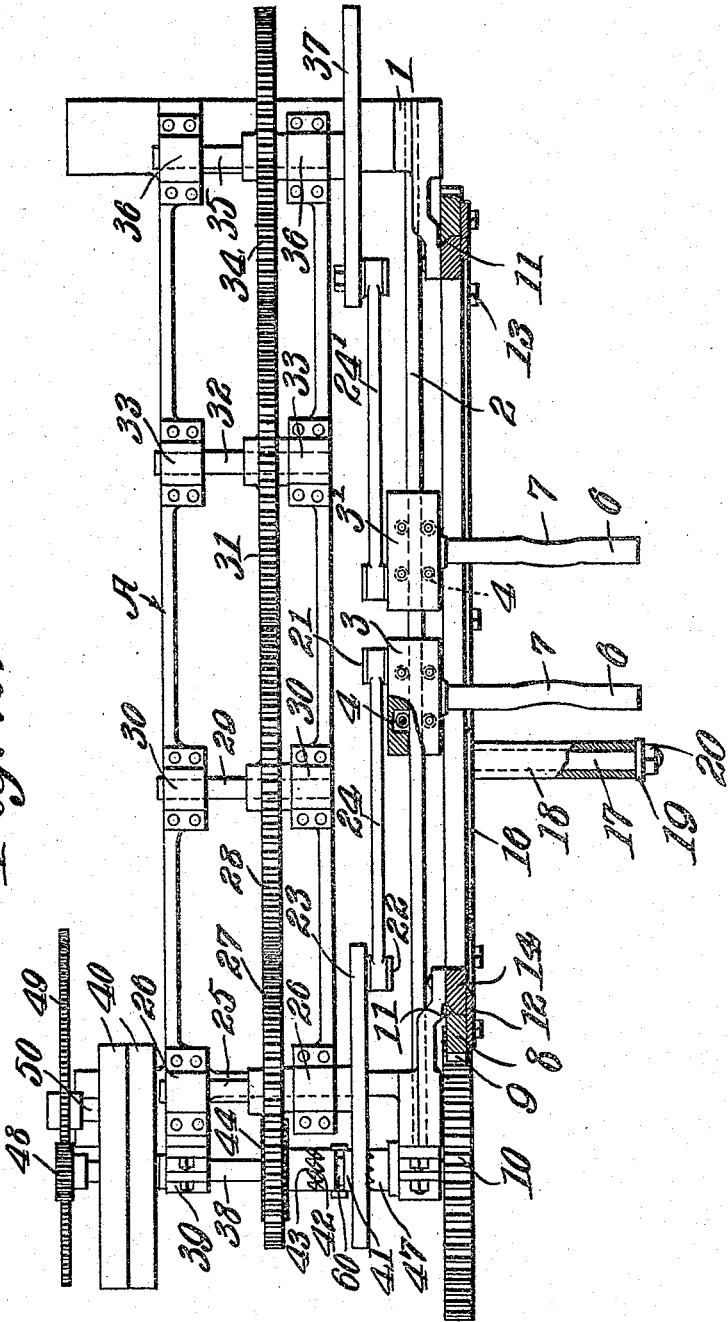

In the accompanying drawings, forming a part of this specification, Figure 1 is a side elevation of a candy pulling machine constructed in accordance with my invention; Fig. 2, is a top plan view with parts in section; Fig. 3, is an end elevation and Fig. 4, is a development of the cam used to operate the intermittent drive.

Similar characters of reference indicate corresponding parts in all the figures of the drawings.

In the accompanying drawings, A indicates a frame of any desirable construction, preferably the ordinary cast iron frame upon which the various working parts of the machine are located. Rising from one side of the frame and at either end thereof are standards 1 to which is fixed at its opposite ends a bar or rod 2 forming a slide upon which two slide blocks 3—3¹ reciprocate, said blocks being provided with anti-friction rollers 4, in engagement with the sides of the bar 2 and other rollers 5, engaging the top and bottom of said bar.

Secured to each block 3—3¹ is an arm or candy pulling member 6, slightly curved as shown at 7, the said curve serving to prevent accidental displacement of the batch of candy. Encircling during its movement, and co-acting with the limited movement of the arms 6—6 is an externally toothed circular rack 8, the teeth 9 of which are in mesh with the teeth of a spur gear pinion 10.

On the inner edge of the rack 8 is an annular flange 11, the inner edge of which is inclined, and this flange on one side together with an annular ring 12 secured to the rack as by bolts 13 or other suitable means, on the other side serve to retain in place said gear rack on a circumferential track 14. The track 14 is securely fixed to the frame A by bolts or otherwise, and as indicated in the drawings is bolted near the bottom to a longitudinal bar 15, extending the full length of the frame, and at points higher up is secured to arms rising from the standards 1, thus holding the gear rack 8 in proper position. The ring 12 carries a projection 16, and although shown as an integral part of the rack 12, it is to be understood that said arm may be a separate piece and bolted or otherwise secured to rack 12. Projection 16 carries an arm 17, adjustable in the slot 17¹, and encircled by a loose sleeve 18, the purpose of which will presently appear, and which is held thereon by a washer 19 and nut 20. Fixed to the block 3, is a wrist pin 21, a similar pin 22 being secured to a rotatable disk 23, connection being made between block 3 and disk 23 by means of a connecting rod 24.

Disk 23 is fixed to a shaft 25 mounted in suitable bearings 26 rising from the frame. The shaft 25 also has fixed thereon a spur gear wheel 27, meshing with another gear wheel 28, the latter being fixed to a shaft 29, mounted for rotation in bearings 30 similar to the bearings 26. Gear 28 also meshes with another gear 31 of the same size fixed to a shaft 32 mounted for rotation in bearings 33. This gear 31 meshes in turn with another gear 34 fixed to a shaft 35 mounted in bearings 36. Fixed to the end of the shaft 35 is a disk 37 similar to the disk 23 and is connected to the block 3¹ by the connecting rod 24¹.

It will here be noted that gears 27 and 34 are of the same size, and as before stated gears 28 and 31 are of the same size; it will therefore, be obvious that a uniform movement will be imparted to the disks 23 and 37 which motion will be communicated to the blocks 3 and 3¹ through their respective connecting rods 24 and 24¹. Mounted at one end of the machine is an intermittent driving mechanism, consisting of a drive shaft 38, said shaft being mounted in a bearing 39 at one end and loosely mounted for rotation within the hub of the gear 10 at the other end.

Shaft 38 is provided with the usual tight and loose belt pulleys 40 for receiving the power from some suitably provided source. Splined to the shaft 38, and slidable thereon, is a clutch sleeve 41, having teeth 42 on one end thereof, adapted to engage teeth 43 formed on the hub of a pinion 44, which is in mesh with the gear 27. On the other end of the clutch 41 are teeth 45 adapted to engage similar teeth 46 on the hub 47 of the aforementioned gear wheel 10. Fixed to the end of the shaft remote from the gear 10, is a small pinion 48, meshing with a large gear 49 fixed to a shaft 50, said shaft having bearings in opposite legs of the frame and fixed to said shaft, intermediate of its ends is a disk 51, having formed in its periphery a cam groove 52, said groove being provided with diametrically opposed off-set portions 53 and 54, and straight portions 55 and 56.

Pivoted at 57 to a lug depending from the frame, is a shifting lever 58, carrying at one end a pin or rollers 59 in engagement with the cam slot 52 and provided at the other end with a yoke, having pins which engage the sides of a groove 60 formed in the clutch sleeve 41, and adapted to move the clutch faces carried thereby into and out of engagement with their respective clutching members when acted upon by the cam 52 through the medium of the lever 58.

It will be noted that the driving shaft 38, is loosely mounted in the hubs of the pinions 10 and 44, while the clutch sleeve 41, is fixed to the shaft 38, so as to have no independent revoluble movement thereon but is slidably mounted for longitudinal movement thereon. In operation let it be assumed that the batch to be pulled has been placed upon the arms 6—6, and has taken the form shown by dotted lines in Fig. 1, with the pin 17 and arms 6—6 in the relative position shown in Fig. 1; the shifting lever 58 will be in the position shown in Fig. 3. Now, should power be applied to the shaft 38 in the direction of the arrow, Fig. 1, movement will be imparted to the cam 51 through the gears 48 and 49, which will cause the lever 58 to be shifted to the left, viewing the machine from the position of Fig. 3, which will move the teeth 45 into engagement with the teeth 46; the pinion 10 will then rotate the rack 8, and the sleeve 18 carried by the pin 17 will be moved into engagement with the loop of candy, carrying it around the two arms 6—6 ready for the next pulling operation.

Since the sleeve 18, is loosely mounted on arm 17, it will be seen that the sleeve after coming in contact with the candy will roll on the pin, thereby preventing any tendency of the candy to wrap on the pin and readily free itself therefrom after wrapping same around the arms 6—6.

The gearing of pinions 10 and 48, driven by the shaft 38, of the rack 8 meshing with pinion 10, and of the gear-wheel 49 meshing with the gear 48 and carried by the shaft 50, which also carries the cam-disk 51, is such relative to that of said cam-disk 51 that the latter will make but half a revolution, when, for a similar period of time, the rack 8 will make an entire or complete revolution. Therefore, coincident with the complete revolution of the projection 16, on the rack 8 the cam groove will have made a one-half revolution, bringing the inclined face 53 into engagement with the roller 59, thus disengaging the clutch faces 45 and 46, and throwing the two faces 42 and 43 into engagement. The arm 16 will now stop at the point from which it first started and remain so, because of the straight portion 55 on the cam face and the arms 6—6 carrying the candy will move to their extreme outward position and back again, the said movement being obtained through the train of gears 44, 27, 28, 31 and 34, causing the disks 23 and 37 to make one rotation. Movement being thus alternately transmitted to the rotary arm 17 and to the oscillating arms or candy pulling members 6—6.

Slight changes might be resorted to in the form and arrangement of the several parts described without departing from the spirit and scope of my invention, and hence I do not wish to limit myself to the exact construction as herein set forth, but—

Having fully described my invention, what I claim as new and desire to secure by Letters Patent, is:

1. In a candy-pulling machine, candy-pulling means, comprising candy-pulling members constructed and arranged to approach and recede from each other, means for lapping the candy around said candy-pulling means, and mechanism for alternately operating the pulling and lapping means.

2. In a candy-pulling machine, candy-pulling means, comprising a pair of arms constructed and arranged to approach and recede from each other, means for lapping the candy around said candy-pulling means, and mechanism for alternately operating the pulling and lapping means.

3. In a candy-pulling machine, candy-pulling means, means for lapping the candy around said candy-pulling means, and comprising a movable arm, and mechanism for alternately operating the pulling and lapping means.

4. In a candy-pulling machine, candy-pulling means, means for lapping the candy around said candy-pulling means, and comprising an arm describing an annular path of travel around said candy-pulling means, and mechanism for alternately operating the pulling and lapping means.

5. In a candy-pulling machine, candy-pulling means, comprising a pair of arms adapted to approach and recede from each other, means for lapping the candy around said candy-pulling means, and comprising a movable arm, and mechanism for alternately operating the pulling and lapping means.

6. In a candy-pulling machine, candy-pulling means, means for lapping the candy around said candy-pulling means, and comprising a movable arm, a revoluble sleeve encircling said arm, and mechanism for alternately operating the pulling and lapping means.

7. In a candy-pulling machine, candy-pulling means, revoluble means carrying a projection, an arm carried by said projection for lapping the candy around said pulling means, and mechanism for alternately actuating the revoluble means and the candy-pulling means.

8. In a candy-pulling machine, candy-pulling means, an annular ring carrying a projection, an arm carried by said projection for lapping the candy around said pulling means, and mechanism for alternately actuating the ring and the candy-pulling means.

9. In a candy-pulling machine, candy-pulling means, revoluble means carrying a projection, an adjustable arm carried by said projection for lapping the candy around said candy-pulling means, and mechanism for alternately actuating the revoluble means and the candy-pulling means.

10. In a candy-pulling machine, candy-pulling means, revoluble means carrying a slotted projection, an arm carried within the slot of said projection for lapping the candy around said pulling-means, and mechanism for alternately actuating the revoluble means and the candy-pulling means.

11. In a candy-pulling machine, a rod, a pair of members slidable on said rod toward and away from each other, candy-pulling arms carried by said members, means for lapping the candy around said candy-pulling arms, and mechanism for alternately operating the lapping-means and said slidable members.

12. In a candy-pulling machine, a rod, a pair of members slidable on said rod toward and away from each other, candy-pulling means carried by said members, means for lapping the candy around said candy-pulling means, a train of gears, mechanism intermediate of and operatively connected with said slidable members and said chain of gears, and mechanism for actuating the lapping-means and said chain of gears.

13. In a candy-pulling machine, a pair of reciprocably-slidable members movable toward and away from each other, candy-pulling means carried by said members, a pair of disks, means operatively connecting each of said disks with its corresponding slidable-member, a train of gears operatively connected to said disks for rotating the same, and mechanism for actuating said train of gears.

14. In a candy-pulling machine, a pair of reciprocably-slidable blocks movable toward and away from each other, candy-pulling members carried by said blocks, and means for simultaneously moving said blocks toward and away from each other.

15. In a candy-pulling machine, a rod, a pair of blocks reciprocably sliding on said rod toward and away from each other, candy-pulling members carried by said blocks, and means for simultaneously moving said blocks toward and away from each other.

16. In a candy-pulling machine, a pair of blocks reciprocably slidable toward and away from each other, candy-pulling members carried by said blocks, means for simultaneously moving said blocks toward and away from each other, and means for lapping the candy around said candy-pulling members.

17. In a candy-pulling machine, a pair of blocks reciprocably slidable toward and away from each other, candy-pulling members carried by said blocks, means for simultaneously moving said blocks toward and away from each other, means for lapping the candy around said candy-pulling means, and means for intermittently actuating said candy-lapping means.

18. A candy-pulling machine, comprising a plurality of parallel shafts with intermeshing gears, a pair of disks carried by a pair of said shafts, a pair of blocks, candy-pulling members carried by said blocks, means for operatively connecting the said disks with said blocks, means for actuating the disks, an arm for lapping the candy around said pulling-members, and means for causing the arm to describe an annular path of travel around said pulling-members.

19. A candy-pulling machine, comprising a plurality of parallel shafts with intermeshing gears; a pair of disks carried by a pair of said shafts; a pair of blocks; a pair of candy-pulling members carried by said blocks; a pair of connecting-rods, provided with wrist-pin connections, operatively connecting said disks with said blocks; means for revolving said disks; an arm for lapping the candy around said pulling-members; a revoluble sleeve encircling said arm; and means for rotating said arm around said pulling-members.

20. A candy-pulling machine, comprising parallel shafts with intermeshing gears, a pair of disks carried by a pair of said shafts, a pair of blocks, a pair of candy-pulling members carried by said blocks, a pair of rods connecting the said disks with said blocks, a revoluble arm, means for causing said blocks to approach and recede from each other, and means for intermittently actuating said arm.

21. A candy-pulling machine comprising a frame, parallel shafts with intermeshing gears carried thereby, a pair of disks carried by a pair of said shafts, a pair of blocks, means on the frame on which said blocks slide, means connecting said disks with said blocks, a gear-rack provided with a projection having an arm, a revoluble sleeve encircling said arm, means for securing the gear-rack revolubly on said frame, and means for revolving said rack, thereby moving said arm around said pulling-members in a circular path.

22. A candy-pulling machine, comprising a frame, parallel shafts with intermeshing gears, a driving-shaft having a pinion on each end thereof, an additional shaft provided with a gear on one end thereof in mesh with the pinion on the end of said shaft; a cam-disk, having a groove therein, carried by said last-mentioned shaft; a clutch-sleeve secured on said driving-shaft, a pinion carried by said driving-shaft adjacent to said clutch-sleeve, said pinion being in mesh with said intermeshing gears on said parallel shafts, means on the last-mentioned pinion and on the pinion on the end of the shaft for engaging with the said clutch, a shifting-lever, means for pivotally securing the said lever to said frame, and means for connecting the said lever with said cam-disk and the said clutch-sleeve.

23. A candy-pulling machine, comprising a frame, a rod carried thereby, blocks slidably carried by said rod, arms carried by said blocks, a pair of shafts, rotatable disks carried thereby, connecting-rods uniting said blocks with the disks by wrist-pins, a train of gears for driving said disks, an annular track secured on said frame, an annular gear-wheel rotatable on said track, a projection carried by said gear-wheel, a candy-lapping arm carried by said projection, and means intermediate said train of gears and said annular gear-wheel for actuating the same.

24. A candy-pulling machine, comprising a frame, shafts mounted therein, gears carried by said shafts, a pair of disks carried by a pair of said shafts, a pair of blocks, arms carried thereby, means on which said blocks are slidably mounted, a pair of connecting-rods uniting said disks with said blocks, a driving-shaft, a pinion carried thereby, by which motion is imparted to said gears, a clutch-sleeve provided with teeth slidably secured on said shaft, means on the pinion for engaging with said clutch-sleeve, a gear secured to one end of said shaft, means provided on the gear for engaging with the opposite end of said clutch-sleeve, a gear-rack, means for securing the rack to the frame, a cam-disk, means for securing said disk to the frame, a shifting-lever connecting said cam-disk with said clutch-sleeve, means for imparting power to said cam-disk, whereby said clutch is made to alternately engage with said pinion and gear-wheel on said shaft, thereby transmitting power to each respective part.

In testimony whereof I affix my signature in presence of two witnesses.

HENRY S. BREWINGTON.

Witnesses:
 MARY M. MAGRAW,
 GEORGE G. SAPP.